United States Patent Office 3,235,578
Patented Feb. 15, 1966

3,235,578
PROCESS FOR THE SOLVENT SEPARATION
OF FATTY ACIDS
Karl T. Zilch, Cincinnati, and Richard H. Plantholt, Mount Healthy, Ohio, assignors to Emery Industries, Inc., Cincinnati, Ohio, a corporation of Ohio
No Drawing. Filed Sept. 25, 1962, Ser. No. 226,180
8 Claims. (Cl. 260—419)

This invention relates to an improved selective crystallization process for the separation of higher fatty acids. The method is of particular utility for recovering stearic and oleic acids of commerce from fatty acid mixtures obtained from glyceride materials of animal origin such as tallow or one of the many available oils and greases.

Oleic acid is a liquid which is sometimes referred to as red oil. It normally contains approximately 75% oleic acid, with the balance of the product being made up of other unsaturated acids together with a small percentage of saturated acids, primarily palmitic acid. Commercial stearic acid, on the other hand, is a waxy solid which is comprised of approximately equal parts of palmitic and stearic acids, the palmitic acid component normally being somewhat in excess. In the method of separation with which this invention is concerned, the fatty acid mixture obtained on the high pressure splitting of the glyceride or otherwise is dissolved in a water-miscible polar solvent such as methyl alcohol, ethyl alcohol, isopropyl alcohol, acetone or the like, the solvent employed normally containing from about 5 to 15% by weight of water for best results. The resulting fatty acid solution (heated, if necessary, to effect complete solution of the acids) is then cooled to a temperature, usually ranging from about 0 to −10° C., at which the "stearic acid" fraction crystallizes out of solution and can be separated from the oleic acid fraction which remains in the filtrate. In commercial operations chilling of the acid solution is normally conducted in a continuous operation, with the crystalline phase also being continuously separated from the liquid phase, usually by means of a rotary filter.

The filter cake so obtained is given a preliminary washing with cold solvent to remove occluded oleic acid, following which it is passed to a solvent still where it is stripped of its solvent content. The residual solids, melted if necessary in the interests of easier handling, are now passed to an acid still, usually operated under high vacuum, from which the stearic acid product is distilled overhead, a representative distillate temperature being about 200° C. at 5 mm. Hg. A residual, or bottoms fraction of unknown composition is also recovered from the acid still, said bottoms fraction probably containing acid polymer and in any event having a substantial portion of methanol-insoluble components. Whatever its composition, this residual stream, identified herein as "stearic acid residue," is that portion of the crystallized fatty acid fraction which boils above the stearic acid distillate and is recovered as a bottoms stream from the acid still.

In an alternate stearic acid recovery method which is followed in many commercial operations, the crystallized, stearic acid fraction, on being freed of its solvent content, is given a hydrogenation treatment before being distilled in vacuo to separate the stearic acid from the less volatile residual fraction referred to above. This hydrogenation step, which reduces the iodine value (I.V.) of the product from a level of about 5–12 to one below 1.0, is conventionally conducted at 160–200° C. and 150–400 p.s.i. hydrogen pressure in the presence of about 0.1–1.0% of a nickel catalyst and preferably 0.1–2% of a clay type filter aid. Once the hydrogenation operation is complete (as evidenced by the desired reduction in I.V.) the product is filtered to remove the solid catalyst and filter aid particles, with the remaining liquid then being distilled in vacuo in the acid still as described in the preceding paragraph. The still residue recovered on distilling off the stearic acid from a hydrogenated stearic acid product (which residue is believed to contain acid polymer along with trace amounts of nickel soaps) is identified and referred to hereinafter as "hydrogenated stearic acid residue."

The oleic acid fraction is usually worked up in a fashion similar to the stearic acid fraction as regards the steps of solvent removal and acid distillation. Here again there is recovered a bottoms fraction boiling above the oleic acid distillate, which bottoms fraction is herein referred to as "oleic acid residue." In some commercial operations the oleic acid is subjected to a hydrogenation treatment as described above to saturate the oleic acid and convert the same to a stearic acid product having a higher content of stearic acid proper than is the case with the "stearic acid" of commerce. The residue obtained on distilling off such a hydrogenated, high stearic acid product is herein identified as "hydrogenated oleic acid residue."

The residues defined above have heretofore been regarded as having little value. However, we have now found that greatly improved results can be obtained in solvent separation operations which are so conducted that a small percentage of one or more of said residues is admixed with the fatty acid/solvent solution prior to chilling the same to effect crystallization of a portion of the dissolved fatty acid mixture. More particularly, use of a residue component permits of a decided increase in the concentration of the mixed fatty acid solution.

As indicated above, the mixture of fatty acids to be separated into component fractions by selective crystallization is first dissolved in an appropriate organic polar solvent. However, the crystal-forming characteristics of the resulting solutions are such that, with tallow acids at least, the concentration of acids in the starting solution may not exceed about 25% by weight if good results are to be obtained during the crystallization and, more particularly, the crystal separation and washing steps. Thus, as the fatty acid concentration materially exceeds 25% the crystal mass formed on cooling the solution partakes of a slimy character and is difficult to handle. Filtering of the crystals is slow, as are subsequent washing steps. Moreover, the washed filter cake tends to occlude an unduly large proportion of oleic acid. This represents not only a net loss of oleic acid, but also necessitates additional hydrogenation if the I.V. of the product is to be reduced to a low level.

From the teachings of U.S. Patent No. 2,298,501, issued October 13, 1942, to Myers et al., it is known that the filtering characteristics of the crystalline fatty acid phase referred to above can be improved by adding a small percentage of a neutral fat (e.g., tallow) to the fatty acid solution to be cooled to effect crystal formation. Moreover, the good results obtained in the presence of the neutral fat tend to persist even as the concentration of fatty acids in the solvent is raised somewhat over previously attainable levels. Thus, working with solutions containing from about ½–2% of tallow it has been possible to raise the concentration of the tallow-derived fatty acids present in the solution from a level of about 25% to one of about 30% while still obtaining a stearic acid crystalline phase which filters and washes well and which has a low residual content of oleic acid.

From the standpoint of operating economy, it is desirable to effect crystallization of the stearic or other fatty acid component of lesser solubility from a solution containing the highest possible concentration of the fatty acid starting mixture. This stems from the fact that all the solvent employed in the crystallization step must later be recovered by distillation or otherwise and then recycled back to the crystallizer for use with the fresh, incoming fatty acid mixture. Solvent recovery is expensive, and the lower the quantity of solvent employed for a given amount of acid mixture, the less the solvent recovery costs will be per unit weight of final product. Expressed otherwise, if the amount of solvent to be passed through the crystallization and solvent recovery zones is kept constant, the change from a low to a relatively high concentration of fatty acid mixture in the solvent will permit of a corresponding increase in the fatty acid throughput rate and hence of the per diem output. This may also result in a lower unit cost for the desired fatty acid end products.

It is an object of this invention to provide a method for the separation, by selective crystallization from solution, of fatty acids from fatty acid mixtures, said method being characterized by the use of solutions having an unusually high concentration of the fatty acid mixture. A further object is to provide a method of this character wherein the fatty acid crystalline phase induced on cooling the solution is capable of being easily filtered and washed to provide a filter cake having a high solids content and a low content of oleic acid as evidenced by a low I.V. A more particular object of this invention is to provide a solvent separation method of the foregoing type which is well adapted for use in separating mixed fatty acids of tallow or other animal origin into respective stearic and oleic acid fractions. The nature of still other objects of the invention will be apparent from a consideration of the descriptive portion to follow.

As generally indicated above, it has now been discovered that the foregoing objects can be achieved by adding to the solution of fatty acids to be separated into component fractions, a small percentage of one or more of the residual fractions obtained on distilling off the separated acid components. The residues contemplated for addition to the solution are those defined above as stearic acid residue, hydrogenated stearic acid residue, oleic acid residue or hydrogenated oleic acid residue. The amount of said residue to be employed will normally range from about 0.25 to 3% based on the weight of fatty acid present, with a preferred range being from about 0.75 to 2%. Amounts larger than 3% by weight of residue can also be employed with success. However, increasing the concentration of residue to such levels provides little if any benefits over and above those obtained at 3% and below. Superior results are obtained with one or the other of the defined hydrogenated residues, and these materials are therefore preferred for use in a practice of the present invention.

The extent to which the concentration of fatty acids in the solvent solution may be increased by a practice of this invention over the levels previously attainable will vary somewhat depending on the nature of the fatty acid starting materials, the solvent and the concentration of water in the solvent. However, where the fatty acid solutions to be separated have heretofore contained 25 to 30% by weight of fatty acid, for example, it is not uncommon to raise the fatty acid concentration to levels of 35 to 45% by adding 0.5 to 2% of a suitable residue, while still obtaining a crystalline precipitate having good filtering characteristics and containing little occluded oleic acid. Further data in this regard are given in the examples.

EXAMPLE 1

The acid separation runs for which data are presented below in Table I were made using 90.5% methanol (9.5% water content) and a mixture of fatty acids as obtained on the high pressure splitting of tallow, said acid mixture containing about 3% myristic acid, 27% palmitic acid, 47% oleic acid, 17% stearic acid and 5% linoleic acid, along with small amounts of various other fatty acids. As indicated in the table, some runs were made without adding any tallow or residue as a crystal modifier, while in others a material of the latter character was employed. The residues added had been obtained by starting with the same mixture of fatty acids, separating them into respective stearic and oleic acid fractions using the same crystallization technique as used in this example, and distilling off the solvent-free oleic and stearic acid fractions so obtained. This distillation was effected in the case of both fractions at a pressure of about 5 mm. Hg abs., and at a distillate temperature of approximately 200° C.±10° C. The one stearic acid residue was obtained without using a preliminary hydrogenation step, whereas the other stearic acid residue and the oleic acid residue had been subjected to a preliminary hydrogenation step to reduce the I.V. of the resulting hydrogenated acid to a level below 1.0, said hydrogenation having been effected at 160–200° C. and at 150–400 p.s.i. hydrogen pressure in the presence of 0.1 to 1% of a nickel catalyst and 0.1 to 2% of an acid-activated montmorillonite clay (Filtrol) as a filter aid. The resulting products were filtered before being distilled in vacuo to distill off the fatty acids and leave the residues here utilized as bottoms.

In conducting the various runs shown in Table I the fatty acid mixtures and any crystal modifier used were dissolved in the methanol. The resulting solution was then cooled to −10° C. in a stirred, scraping crystallizer. The resulting slurries were then filtered using a Buchner funnel while maintaining a 15 p.s.i. vacuum until no liquid layer was visible above the crystalline layer. The latter was then washed under these same conditions using 200 parts by weight of the 90.5% methanol at −10° C. for each 100 parts of the solid cake in the funnel. Observations were made as to the character of the slurry which was first poured into the funnel. Those indicated in the table as being thin had unusually good (rapid) filtering characteristics; those described as medium (minus) or medium were also quite satisfactory, while those designated as medium (plus) were filtered only with considerable difficulty and in some cases would have presented a problem in plant operation.

Tests were run on the washed filter cake to determine (1) its content of solids and (2) the I.V. of the solid fraction of the cake as later freed of solvent (and water) by heating on a steam bath followed by drying on a hot plate. A high solids content in the cake is desirable, for this indicates a correspondingly low content of solvent to be evaporated and returned to the crystallizer unit. The I.V. should also be as low as possible, indicating a low content of occluded oleic acid in the washed and dried solids fraction. In these runs an I.V. of approximately 8 or below is regarded as satisfactory, though the values obtained in plant practice might run somewhat higher (or lower) depending on the nature of the equipment employed, the severity of the washing step(s), etc.

TABLE I

*Crystallization of stearic acid from solution of tallow acids in 90.5% MeOH at −10° C.*

| Crystal Modifier | Concentration of Tallow Acids in MeOH, Percent | Slurry Character | Washed Cake | |
|---|---|---|---|---|
| | | | Percent Solids | I.V. |
| None | 25 | Med | 37.8 | 6.3 |
| Do | 30 | Med | 30.4 | 14.4 |
| 0.5% Tallow | 25 | Med | 35.0 | 8.7 |
| 1% Tallow | 30 | Med.+ | 43.6 | 7.1 |
| Do | 35 | Med.+ | 32.1 | 7.5 |
| Do | 40 | Med.+ | 38.6 | 9.0 |
| 2% Tallow | 40 | Med | 42.6 | 9.3 |
| 0.5% Hydrog. Stearic Acid Residue | 40 | Med | 50.1 | 6.9 |
| 1% Hydrog. Stearic Acid Residue | 40 | Med | 47.5 | 6.7 |
| Do | 45 | Med | 58.5 | 7.5 |
| Do | 50 | Med.+ | 46.7 | 8.8 |
| 2% Hydrog. Stearic Acid Residue | 40 | Med.− | 46.5 | 6.6 |
| Do | 45 | Med.− | 51.7 | 8.1 |
| 1% Stearic Acid Residue | 35 | Thin | 48.4 | 6.9 |
| Do | 40 | Thin | 44.7 | 7.4 |
| Do | 45 | Med.+ | 42.2 | 9.9 |
| 1% Hydrog. Oleic Acid Residue | 45 | Med.+ | 44.4 | 7.3 |

From the data presented in the above table it will be seen that use of an appropriate residual material promotes the formation of crystals having good filtering characteristics and other desirable attributes. At the same time, use of the residue makes it possible for the operator to employ solutions having a far greater concentration of fatty acid than would otherwise be possible, while still obtaining a solid phase which filters well, is high in solids content and has a low I.V.

The invention has been described and illustrated above as it relates to the separation of the respective stearic and oleic acid fractions of a fatty acid mixture recovered from an animal source such as tallow, yellow grease or the like. It has been shown that an effective and economical separation of these acid fractions can be made from solutions higher in fatty acid content than would otherwise be possible, the increase resulting from the use of a small percentage of a residual stream obtained on distilling off the fatty acids from the separated acid fractions. Particularly good results are obtained with residues left on distilling off the fatty acids from the (saturated) acid fraction recovered as a crystalline precipitate, or from its equivalent fraction, i.e., the stearic acid product obtained on hydrogenating the oleic acid fraction, the latter material being that referred to herein as the "hydrogenated oleic acid residue."

The process is also of utility when working with other acid mixtures which can be separated by crystallization from solution in a polar solvent. Thus, when palmitic acid is to be separated from a mixture of palmitic and stearic acids, a palmitic-rich fraction can be separated out as the crystalline phase. Again in separating oleic acid from a mixture consisting essentially of oleic acid and linoleic acids (tall oil acids), oleic-rich fraction crystallizes out. In either case, the benefits of this invention may be gained by adding to the solvent-acid solution a small percentage of the residue obtained on distilling off the acid from the recovered crystalline phase. Alternatively, good results in such systems can be obtained by adding one of the residues referred to above as formed on distilling off the stearic acid from a saturated acid component fraction as recovered from tallow acids.

Again, in the case of a mixture of branched and straight chain saturated acids containing approximately 18 carbon atoms in the molecule, as described in U.S. Patent No. 2,812,342, wherein the straight chain acids tend to precipitate from solution as the crystalline phase, there may be employed a residue such as that left in the still on distilling off the acids from said phase. Here, too, good results have been obtained by using a hydrogenated stearic acid residue of the type defined above as obtained from tallow acids.

We claim:

1. The method of conditioning a solution of a higher fatty acid mixture in a polar solvent to promote the formation of a readily filterable crystalline phase on cooling said solution to selectively crystallize a fraction of the fatty acid mixture, which method comprises incorporating in said solution a residue left on distilling the fatty acids from a fatty acid fraction separated from a mixture of fatty acids by crystallization from a cooled solution.

2. The method of claim 1 wherein the residue is a stearic acid residue and is added to the solution in an amount of from 0.25 to 3.0%, based on the weight of fatty acids present in the solution.

3. The method of claim 1 wherein the residue is a hydrogenated stearic acid residue and is added to solution in an amount of from 0.25 to 3.0%, based on the weight of fatty acids present in the solution.

4. The method of claim 1 wherein the residue is an oleic acid residue and is added to the solution in an amount of from 0.25 to 3.0%, based on the weight of fatty acids present in the solution.

5. The method of claim 1 wherein the residue is a hydrogenated oleic acid residue and is added to the solution in an amount of from 0.25 to 3.0%, based on the weight of fatty acids present in the solution.

6. The method of claim 1 wherein the residue added to the solution is that left on distilling off the fatty acids present in said crystalline phase.

7. In a process wherein a mixture of higher fatty acids derived from an animal fat is dissolved in a polar solvent, the solution is chilled to crystallize a fatty acid fraction therefrom which is higher in stearic and palmitic acids than the starting mixture, the resulting crystal fraction is then filtered off, freed of solvent content and then distilled in vacuo to distill off a stearic and palmitic acid containing fraction and leave a higher-boiling residue fraction which is recovered as bottoms, the improvement which comprises adding a portion of said residue fraction to the mixed fatty acid solution to be chilled, the amount so added being from about 0.25 to 3.0% of the weight of fatty acid present.

8. In a process wherein a mixture of higher acids derived from an animal fat is dissolved in a polar solvent, the solution is chilled to crystallize a fatty acid fraction therefrom which is higher in stearic and palmitic acids than the starting mixture, the resulting crystal fraction is then filtered off, freed of solvent content and then hydrogenated in the presence of a nickel catalyst, and wherein the hydrogenated product after being filtered to remove any solids is distilled in vacuo to distill off a stearic and palmitic acid containing fraction and leave a higher-boiling residue fraction which is recovered as bottoms, the improvement which comprises adding a portion of said residue fraction to the mixed fatty acid solution to be chilled, the amount so added being from about 0.25 to 3.0% of the weight of fatty acid present.

References Cited by the Examiner

UNITED STATES PATENTS 2,298,501  10/1942  Myers et al. _____ 260—419

CHARLES B. PARKER, *Primary Examiner.*